(12) United States Patent
Nakamura et al.

(10) Patent No.: US 7,512,733 B2
(45) Date of Patent: Mar. 31, 2009

(54) SEMICONDUCTOR MEMORY AND MEMORY CONTROLLER THEREFOR

(75) Inventors: Tsutomu Nakamura, Kanagawa (JP); Yamagata Hiroshi, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 308 days.

(21) Appl. No.: 11/366,184

(22) Filed: Mar. 2, 2006

(65) Prior Publication Data

US 2007/0079056 A1    Apr. 5, 2007

(30) Foreign Application Priority Data

Sep. 30, 2005    (JP) .............................. 2005-285936

(51) Int. Cl.
    *G06F 12/00* (2006.01)
(52) U.S. Cl. .................... 711/103; 711/105; 365/185.33
(58) Field of Classification Search .................. 711/103; 365/185.33
    See application file for complete search history.

(56) References Cited

U.S. PATENT DOCUMENTS

| | | | |
|---|---|---|---|
| 6,115,323 A * | 9/2000 | Hashimoto | 365/238.5 |
| 6,401,166 B2 * | 6/2002 | Chiba | 711/103 |
| 6,412,039 B1 * | 6/2002 | Chang | 711/5 |
| 6,622,196 B1 * | 9/2003 | Mitani | 711/5 |
| 7,020,739 B2 * | 3/2006 | Mukaida et al. | 711/103 |
| 2005/0193161 A1 * | 9/2005 | Lee et al. | 711/103 |

FOREIGN PATENT DOCUMENTS

JP    2005100501    4/2005

* cited by examiner

*Primary Examiner*—Kevin L Ellis
*Assistant Examiner*—Hashem Farrokh
(74) *Attorney, Agent, or Firm*—Pamela R. Crocker

(57) ABSTRACT

The present invention relates to AG-AND-type flash memory which reads management information about a plurality of clusters in a short time, wherein a plurality of clusters are arranged as rows of a matrix, and a plurality of banks are arranged as columns. Single management information is stored in specific pages of all blocks belonging to a certain cluster. For instance, management information (having contents C0) about cluster is stored in specific pages of all blocks. Simultaneous access can be made to a plurality of the banks. Upon system startup, the management information is read obliquely such that the management information about cluster is read from bank 0; . . . , and such that the management information about cluster 3 is read from bank 3. Accordingly, the management information about a plurality of the clusters can be read in a single access operation.

5 Claims, 3 Drawing Sheets

US 7,512,733 B2

SEMICONDUCTOR MEMORY AND MEMORY CONTROLLER THEREFOR

FIELD OF THE INVENTION

The present invention relates to semiconductor memory and memory controller therefor, and particularly, to a technique for reading data.

BACKGROUND OF THE INVENTION

In addition to NAND-type flash memory, NOR-type flash memory, and the like, AG-AND-type flash memory, in which an assist gate is arranged adjacent to a floating gate, has been widely used as memory of portable equipment such as a digital camera.

FIG. 5 shows a conceptual configuration of AG-AND-type flash memory (hereinafter simply called AG-AND flash memory). A single block is formed from a plurality of pages (two pages), each of which is a unit for reading and writing data (each page is formed from a plurality of sectors), and a single cluster is formed from a plurality of blocks (four blocks). Reading and writing of data can be executed on a per-page basis, and deletion of data can be executed on a per-block basis. The AG-AND flash memory has a plurality of banks (e.g., four banks). The banks can be subjected to parallel processing access, and access can be made simultaneously to the banks.

Each of the pages is formatted into a data area and a control area. The control area stores address information, a physical-logical address correspondence table, generation information, and management information about presence/absence of an invalid flag, all of which pertain to all blocks belonging to a certain cluster in the control area. The reason for this is that, in AND-type flash memory, the physical-logical address correspondence table includes a maximum of several percentages of unavailable areas. An invalid flag in the unavailable area must be set to make a logical address such that a physical address of that area is not used. For instance, the physical-logical address correspondence table is a table where, when a physical address 0002h is unavailable, the next physical address 0003h is taken as a logical address 0002h.

As shown in FIG. 6, when all blocks belonging to a certain cluster exist across a plurality of banks (bank 0, bank 1, bank 2, and bank 3), management information 100 about the cluster is stored in a specific location (a control area) of a specific page (the first page) of a leading bank (bank 0). When data are read from a certain cluster, access is first made to bank 0, to thus read management information and acquire address information about all the blocks belonging to the cluster. In accordance with the thus-acquired address information, reading is performed simultaneously in relation to all the banks, whereby data are acquired.

Upon start-up of portable equipment such as a digital camera or the like, management information about all clusters must be read and acquired. However, according to a conventional reading scheme, reading management information about all clusters entails consumption of much time, thereby contributing to an increase in the time required to initialize a system.

Conventionally, as shown in FIG. 6, the management information about a cluster is stored in a specific page of a leading bank (bank 0), and in a single operation only one page from a certain bank can be read. For this reason, management information about cluster 0 is read through first reading operation; management information about cluster 1 is read through second reading operation; and management information about cluster 2 is read through third reading operation. Thus, reading operations must be performed in equal number to the clusters, thereby raising a problem of an increase in processing time as the number of clusters increases.

The present invention provides a device capable of quickly reading data such as management information about clusters.

SUMMARY OF THE INVENTION

The present invention provides semiconductor memory constructed by a plurality of memory cells, comprising:
pages which are units for executing reading and writing of data;
blocks, each of which is formed from a plurality of the pages;
a cluster which is formed from a plurality of the blocks; and
a plurality of banks to which a simultaneous access can be made, wherein
a certain cluster is constructed by a plurality of blocks across a plurality of banks, and an identical set of unique information about the cluster is stored in a specific position on specific pages of each block constructing the cluster.

The present invention also provides a memory controller for reading unique information from the semiconductor memory, wherein all blocks forming a single cluster exist in separate banks; and
unique information about a plurality of the clusters is simultaneously read by concurrently reading the single, specific pages from a plurality of the banks when the unique information about a plurality of the clusters is read in accordance with a read command from a higher-level system.

In an embodiment of the present invention, the semiconductor memory is arranged in a matrix pattern. A plurality of clusters "i" ("i" designates a positive integer) are arranged as rows of the matrix, and a plurality of banks "j" ("j" designates a positive integer) are arranged as columns of the same. When unique information is simultaneously read from a plurality of the banks, reading is performed in a diagonal direction where "i"="j" is achieved; namely, reading is performed obliquely with respect to the memory cells arranged in the matrix pattern, thereby simultaneously reading the unique information about a plurality of the clusters in a single reading operation.

According to the present invention, unique information, such as management information or the like, about a certain cluster is stored in specific pages of all blocks constituting a certain cluster (or belonging to a certain cluster) rather than in a specific page of a specific block. Access is made to a plurality of the banks simultaneously, so that the unique information about a plurality of the clusters can be acquired by a single access operation. Consequently, processing time which is required, as startup of a system, to acquire unique information about a plurality of clusters can be shortened.

The invention will be understood more clearly by reference to the embodiments provided below. However, the scope of the invention is not limited to those embodiments.

BRIEF DESCRIPTION OF THE DRAWINGS

Preferred embodiment of the present invention will be described in detail based on the following figures, wherein.

DETAILED DESCRIPTION OF THE PREFERRED EMBODIMENT

Taking a digital camera as an example of portable equipment having AG-AND flash ROM, an embodiment of the present invention will be described hereinbelow by reference to the drawings.

Figure 1:
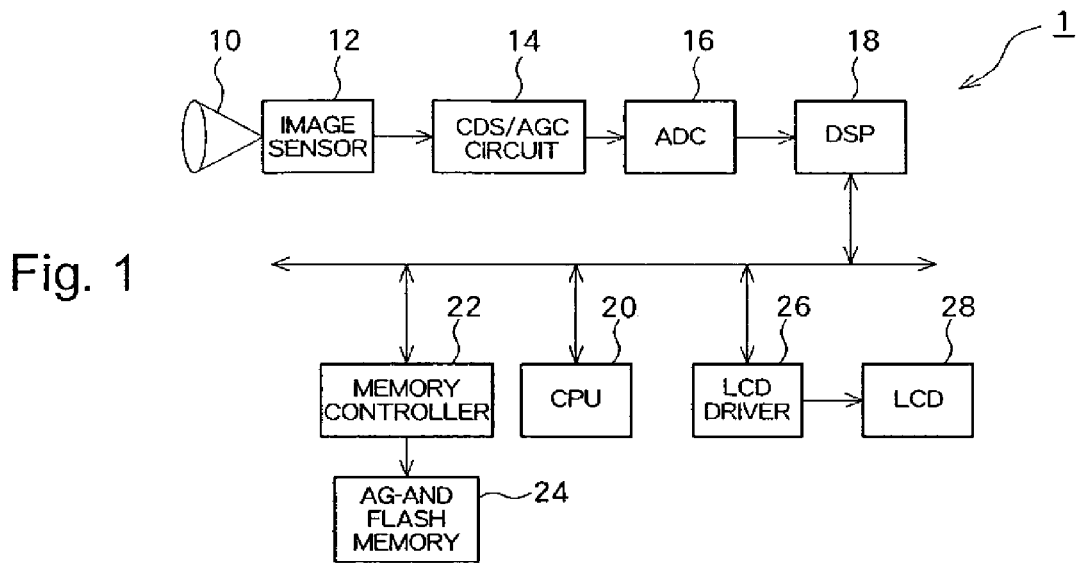
FIG. 1 is a configurational block diagram of a digital camera of an embodiment of the present invention.

FIG. 1 is a configurational block diagram of a digital camera 1 of the present embodiment. Light of a subject (hereinafter called "subject light"), which has formed an image by way of an optical system, such as an optical system including a lens 10, a shutter, and an aperture, is guided to an image sensor 12.

The image sensor 12 is formed from a CCD or a CMOS, and subjects incoming subject light to photoelectric conversion and outputs a resultant electric signal to a CDS (Correlated Double Sampling)/AGC (Automatic Gain Control) circuit 14 as an image signal. The CDS/AGC circuit 14 subjects the image signal to sampling and gain adjustment, and then outputs the adjusted image signal to an ADC (Analog-to-Digital Converter) 16. The ADC 16 converts the analog image signal to a digital image signal and outputs the digital image signal to a DSP (Digital Signal Processor) 18. The DSP 18 subjects the digital image signal to known image processing, such as gamma correction, edge enhancement processing, white balance adjustment processing, compression processing, and the like, and outputs the thus-processed signal to a liquid crystal display (LCD) driver 26 and a memory controller 22. The LCD driver 26 outputs to and displays on a LCD 28 the image signal delivered from the DSP 18. A central processing unit (CPU) 20 controls operations of the individual sections of the digital camera 1. Especially, exposure control and photographing operation control are performed in accordance with a command from the user. In cooperation with the CPU 20, the memory controller 22 controls reading and writing of data from and to AG-AND flash memory 24.

The AG-AND flash memory 24 stores a control program and image data. The AG-AND flash memory 24 has a structure including a physical layer, a driver, and a FAT file system. During memory formatting operation, a physical-logical address correspondence table is prepared, and the thus-prepared table is stored in the driver. Upon startup of the driver, the address correspondence table is copied to RAM of the system, thereby preparing for access. Upon system startup incident to power-on, the memory controller 22 makes an access to the AG-AND flash memory 24, to thus read management information about all clusters and supply the information to the CPU 20.

Figure 6:
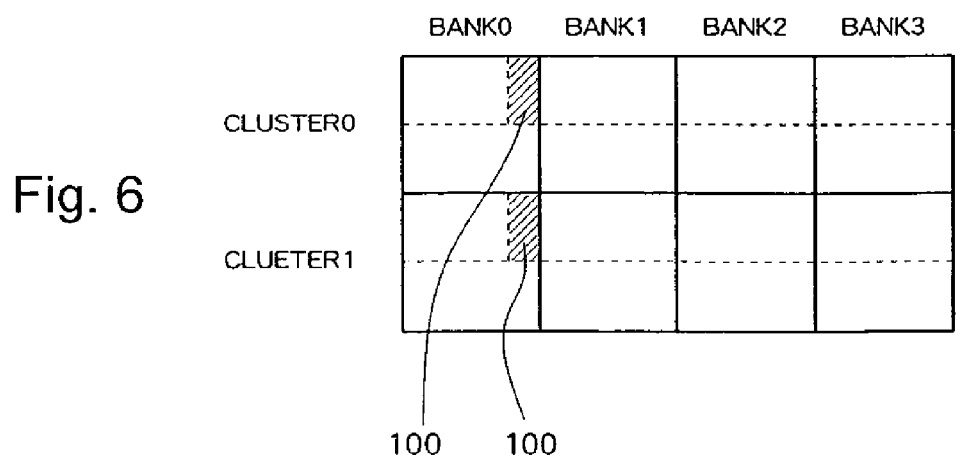
FIG. 6 is a view for describing a stored state of conventional management information.

As shown in FIG. 6, management information about a certain cluster has hitherto been stored in a control area of a specific page of a leading bank (bank 0). However, the memory controller 22 of the present embodiment writes the management information about the cluster into control areas on specific pages of all blocks belonging to the cluster.

Figure 2:
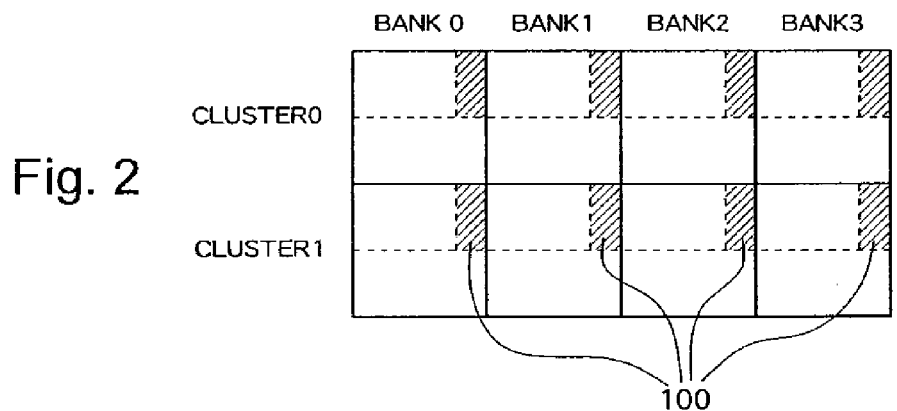
FIG. 2 is a view for describing a stored state of management information in the present embodiment.

FIG. 2 shows storage areas of cluster management information 100 of the present embodiment. The cluster is formed from four blocks, and the respective blocks exist in different banks. On the assumption that the four blocks are taken as block 0, block 1, block 2, and block 3, block 0 is stored in bank 0; block 1 is stored in bank 1; block 2 is stored in bank 2; and block 3 is stored in bank 3. The management information 100 is stored in control areas on specific pages of all blocks forming the cluster. When two pages forming a block are assumed to be a first page and a second page, the specific page corresponds to the first page (an upper page in the drawing). All the sets of management information 100 stored in the specific pages of all the blocks belonging to a certain cluster are identical. In relation to, e.g., cluster 0, contents of the management information 100 stored in the specific page of the block of bank 0 are taken as C0, and contents of the management information stored in specific pages of the blocks of bank 1, bank 2, and bank 3 are also C0. C0 includes address information, a physical-logical address correspondence table, generation information, and information about presence/absence of an invalid flag, all of which pertain to all blocks belonging to cluster 0. Similarly, in relation to cluster 1, contents of the management information 100 stored in the specific pages of the blocks of bank 0 are assumed to be C1, and contents of the management information 100 stored in the specific pages of the blocks of bank 1, bank 2, and bank 3 are also C1. As mentioned above, when writing management information into the control areas, the memory controller 22 of the present embodiment stores single management information into all blocks belonging to a certain cluster; namely, the management information about the certain cluster is caused to exist in a plurality of the banks in an overlapping manner. In the AG-AND flash memory 24, access can be made simultaneously to bank 0, bank 1, bank 2, and bank 3. Even when access can be made to only one page in each bank, a plurality of the sets of management information 100 can be read in a single access operation, because the management information about the cluster exists in a plurality of the banks.

A data reading method of the present embodiment will be described hereunder.

Figure 3:
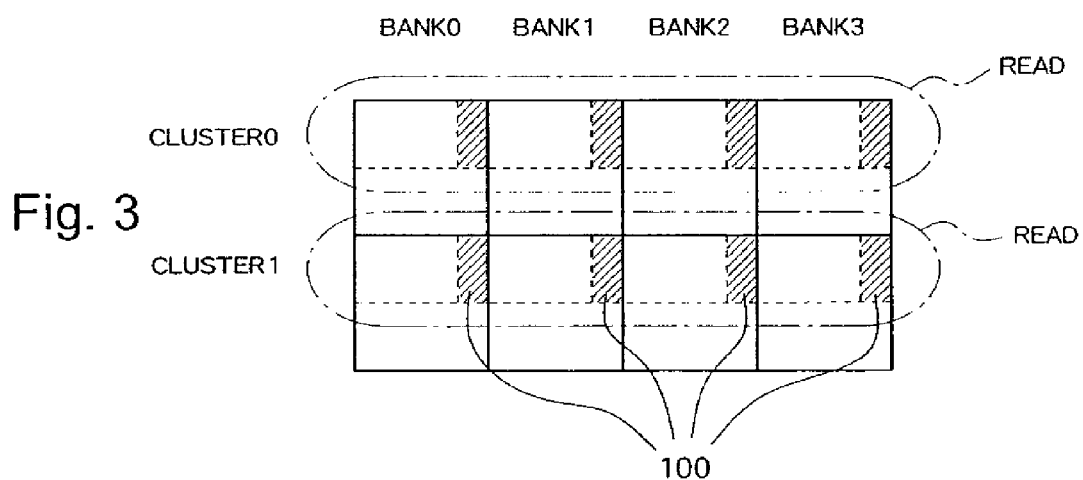
FIG. 3 is a view for describing a reading method of the present embodiment.

FIG. 3 shows an example data reading method. This method is for simultaneously making access to bank 0, bank 1, bank 2, and bank 3 when the management information 100 about a certain cluster 0 is read, to thus read the management information. Since the management information 100 about cluster 0 exists in all banks 0 to 3 in an overlapping manner, there is no necessity for first accessing leading bank 0 to read the management information 100 therefrom, which has hitherto been required. The management information 100 about cluster 0 can be read from any bank. The same also applies to cluster 1. Even when access is made to any of bank 0, bank 1, bank 2, and bank 3, the management information 100 can be read.

Figure 4:
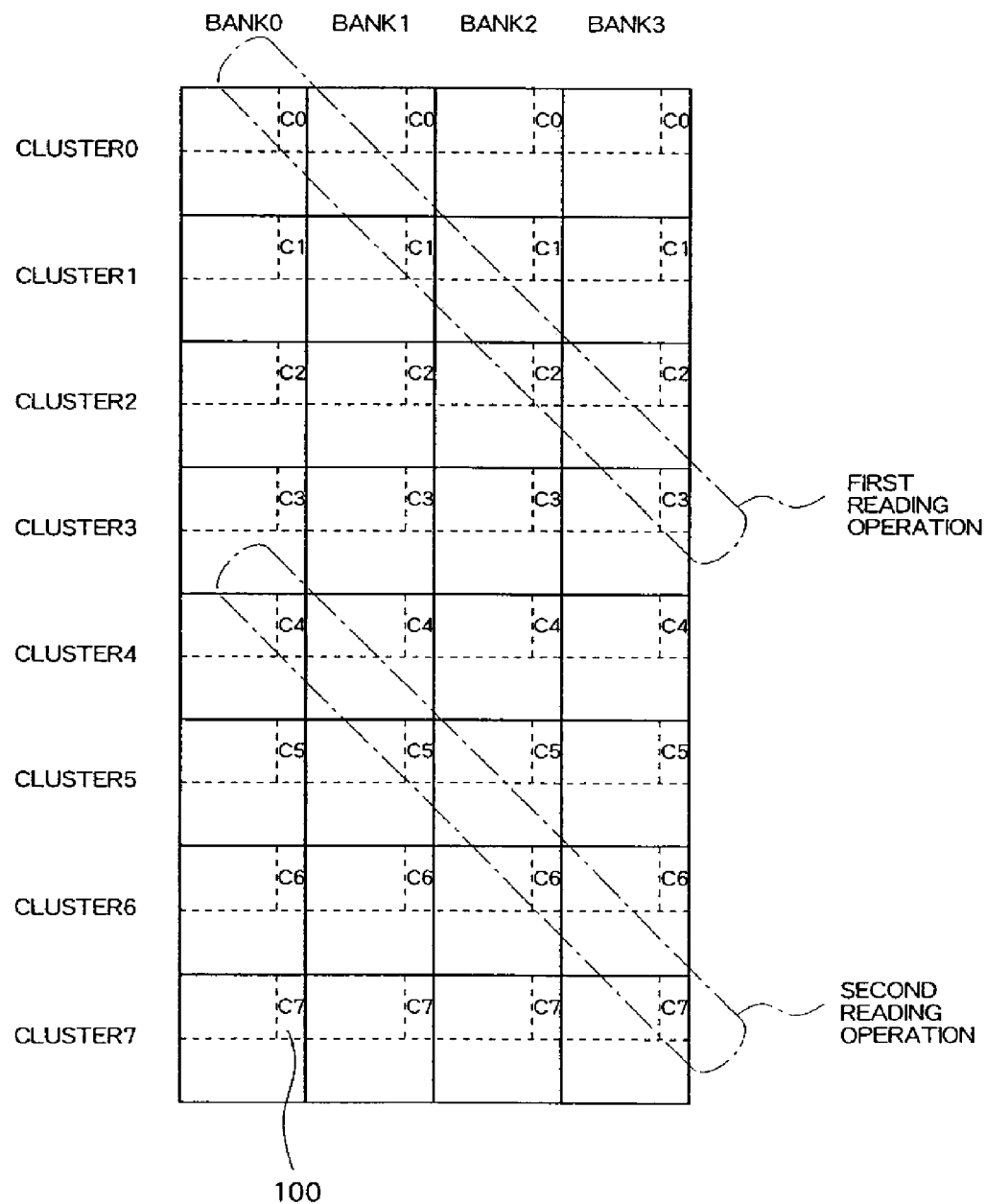
FIG. 4 is a view for describing another reading method of the present embodiment.
Figure 5:
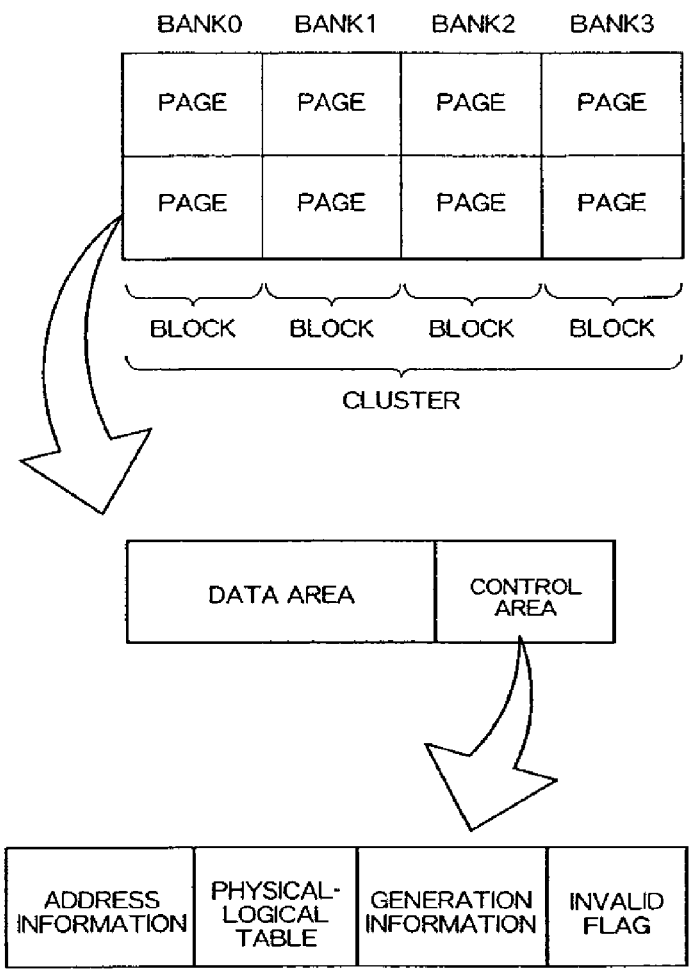
FIG. 5 is a conceptual configuration diagram of AG-AND flash memory.

FIG. 4 shows another example of the data reading method, showing a case where the management information 100 about all clusters is read at system startup. In the drawing, cluster 0, cluster 1, cluster 2, cluster 3, . . . , cluster 7 [these clusters are assumed to be represented as cluster "i" ("i"=0, 1, 2, 3, . . . )] are assumed to be arranged as rows. Bank 0, bank 1, bank 2, bank 3 [these banks are assumed to be represented as bank "j" ("j"=0, 1, 2, . . . )] are assumed to be arranged as columns. The management information 100 about cluster 0 exists in bank 0, bank 1, bank 2, and bank 3, and contents of the management information are taken as C0. Since access can be made simultaneously to banks 0 to 3, when writing the management information 100 about cluster 0, the memory controller 22 writes the management information into all the banks 0 to 3 concurrently. Specifically, the management information 100, which has heretofore been written solely into bank 0, is written into the other banks 1, 2, and 3, as well. Similarly, the management information 100 about cluster 1 exists across all the banks 0 to 3, and contents of the management information are taken as C1. The management information 100 about cluster 2 also exists across all the banks 0 to 3, and contents of the management information are taken as C2. The same also applies to clusters 3 to 7, and contents of the management information 100 are taken as C3 to C7.

In such a memory configuration, a request for acquiring cluster management information is transmitted from the CPU 20 to the memory controller 22 upon system startup. When reading the management information 100 about all clusters from the AG-AND flash memory 24 in response to this request, the memory controller 22 simultaneously reads data in a diagonal direction as illustrated. Specifically, elements of the matrix are represented as (i, j), and reading a specific page of bank 0 corresponding to j=0 is performed in relation to cluster 0 corresponding to i=0, to thus read the management information 100 having contents C0. Reading a specific page of bank 1 corresponding to j=1 is performed in relation to cluster 1 corresponding to i=1, to thus read the management information 100 having contents C1. Reading a specific page of bank 2 corresponding to j=2 is performed in relation to cluster 2 corresponding to i=2, to thus read the management information 100 having contents C2. Reading a specific page of bank 3 corresponding to j=3 is performed in relation to cluster 3 corresponding to i=3, to thus read the management information 100 having contents C3. Since access can be made simultaneously to banks 0 to 3, the management information 100 about a plurality of the clusters; i.e., cluster 0, cluster 1, cluster 2, and cluster 3, can be read in a single access operation, because, as mentioned above, reading is performed diagonally or obliquely.

As in the case of clusters 0 to 3, reading is again performed diagonally or obliquely in relation to clusters 4 to 7. Specifically, a specific page of bank 0 is read in relation to cluster 4; a specific page of bank 1 is read in relation to cluster 5; a specific page of bank 2 is read in relation to cluster 6; and a specific page of bank 3 is read in relation to cluster 7, whereby the management information 100 (C4 to C7) about clusters 4 to 7 can be read in a single reading operation. In a second reading operation, cluster 4 corresponds to i=4, and i=4 is replaced with i=0, so that diagonal reading, where i=j is achieved, is performed.

Conventionally, when all sets of the management information 100 about clusters 0 to 7 are read in the related art, the management information 100 about cluster 0 is first read from bank 0; the management information 100 about cluster 1 is read second from bank 0; the management information 100 about cluster 2 is read third from bank 0; and these reading operations are repeated in subsequent operation. Thus, eight reading operations, which are equal in number to the clusters, are required. In contrast, in the present embodiment only two reading operations are required, so that processing time is significantly shortened. The memory controller 22 outputs to the CPU 20 the management information, which has been read through the operation set forth.

As mentioned above, the present embodiment utilizes the property of the AG-AND flash memory 24; namely, the ability to store a single set of management information in all blocks constituting a certain cluster and to make simultaneous access to a plurality of banks, so that management information about a plurality of clusters can be acquired in a single reading operation. Even in the present embodiment, note that only specific pages of respective banks are merely subjected to reading as in the related art. Specifically, shortening of processing time is achieved without any alterations to the method for reading information from the respective banks.

In the present embodiment, management information is stored across a plurality of banks, and hence the management information can be read in a random manner as an alternative to being read in the diagonal direction or the oblique direction. For instance, in the embodiment shown in FIG. 4, the management information 100 about cluster 0 is read from bank 1; the management information 100 about cluster 1 is read from bank 0; the management information 100 about cluster 2 is read from bank 3; the management information 100 about cluster 3 is read from bank 2; and the like. Even when the management information cannot be read from blocks of bank 0, the information can be read from another bank. Accordingly, the reliability of the system is enhanced. For instance, there is a conceivable technique of setting default reading in a diagonal direction in combination with random reading, providing read error detection means, and, when the read error detection means has detected a read error, retrying reading operation by means of random reading.

In the present embodiment, all blocks belonging to a certain cluster exist in a single row. Accordingly, management information about a plurality of clusters can be acquired in a single reading operation by means of diagonally reading the blocks. To assure this, if an error has arisen in a certain block, making the entire row to which the block belongs unavailable is desirable. More specifically, if an error has arisen in a certain block, another possibility to make only the block unavailable and make the other blocks belonging to the same row available just as they are. However, blocks belonging to a certain cluster spread across a plurality of rows, which in turn makes address management complicated. When an error has arisen in a certain block, the entire row is made unavailable, to thus facilitate address management and also enable simultaneous acquisition of the sets of management information 100 about a plurality of clusters by means of oblique reading. Moreover, since blocks are made unavailable on a per-row basis, program management on a per-row basis also becomes feasible. Stepwise loading of a program at system startup also becomes easy.

The present embodiment has illustrated the management information 100, such as address information about all blocks belonging to a cluster and a physical-logical address correspondence table. The present embodiment can be applied to arbitrary information, so long as the information is unique to clusters (unique information).

The invention has been described in detail with particular reference to certain preferred embodiments thereof, but it will be understood that variations and modifications can be effected within the spirit and scope of the invention.

PARTS LIST 0 bank
1 bank
1 digital camera
0002h bank
2 bank
0003h bank
3 bank
10 lens
12 image sensor
14 circuit
16 analog to digital converter
18 digital signal processor
20 central processing unit
22 memory controller
24 AG-AND flash memory
26 LCD driver
28 LCD
100 management information

The invention claimed is:

1. A semiconductor memory constructed by a plurality of memory cells, comprising:

pages which are units for executing reading and writing of data;

blocks, each of which is formed from a plurality of the pages;

a plurality of clusters, one or more of the plurality of clusters is formed from a plurality of the blocks; and a plurality of banks to which simultaneous access can be made, wherein one or more of the plurality of clusters are constructed by a plurality of blocks across a plurality of banks, and an identical set of unique information about at least one of the one or more cluster is stored in a specific position on specific pages of each block constructing the at least one of the one or more clusters, allowing for unique information about a plurality of the clusters to be read simultaneously by concurrently reading the single specific pages from a plurality of the banks when the unique information about a plurality of the clusters is read.

2. The semiconductor memory according to claim 1, wherein the unique information is address information about all blocks constituting a certain cluster, and cluster management information including a conversion table of a physical address and a logical address.

3. A memory controller for reading unique information from semiconductor memory constructed by a plurality of memory cells, the semiconductor memory including: pages which are units for executing reading and writing of data; blocks, each of which is constructed by a plurality of the pages; a cluster which is constructed by a plurality of the blocks; and a plurality of banks to which simultaneous access can be made, a certain cluster being constructed by a plurality of blocks across a plurality of banks, and an identical set of unique information about the cluster being stored in a specific position on specific pages of each block constructing the cluster, wherein all blocks forming a single cluster exist in separate banks; and unique information about a plurality of the clusters is read simultaneously by concurrently reading the single specific pages from a plurality of the banks when the unique information about a plurality of the clusters is read in accordance with a read command from a higher-level system.

4. The memory controller according to claim 3, wherein the semiconductor memory is arranged in a matrix pattern; a plurality of clusters "i" ("i" designates a positive integer) are arranged as rows of the matrix, and a plurality of banks "j" ("j" designates a positive integer) are arranged as columns of the same; and, when unique information is simultaneously read from a plurality of the banks, reading is performed in a diagonal direction where "i"="j" is achieved.

5. The memory controller according to claim 3, wherein the semiconductor memory is arranged in a matrix pattern; a plurality of clusters are arranged as rows of the matrix, and a plurality of banks are arranged as columns of the same; and, when unique information is simultaneously read from a plurality of the banks, reading is performed obliquely with respect to the matrix pattern.

* * * * *